(12) United States Patent
Amidon

(10) Patent No.: US 7,577,405 B1
(45) Date of Patent: Aug. 18, 2009

(54) DISPOSABLE RADIO COMMUNICATION DEVICE

(75) Inventor: Charles Philip Amidon, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 399 days.

(21) Appl. No.: 11/183,314

(22) Filed: Jul. 15, 2005

(51) Int. Cl.
*H04B 1/38* (2006.01)
*H04M 1/00* (2006.01)
*H04M 11/04* (2006.01)

(52) U.S. Cl. .................. 455/90.1; 455/90.3; 455/550.1; 455/575.1; 455/404.1; 455/404.2

(58) Field of Classification Search ....... 455/90.1–90.3, 455/550.1, 552.1, 556.1, 575.1, 575.8, 572, 455/74, 404.1, 404.2, 414.1, 456.1–456.3, 455/414.2

See application file for complete search history.

(56) References Cited

U.S. PATENT DOCUMENTS

| | | | |
|---|---|---|---|
| 4,763,307 A | 8/1988 | Massa | |
| 5,588,398 A | 12/1996 | Allen, II et al. | |
| 5,946,610 A * | 8/1999 | Hama | 455/351 |
| 6,244,375 B1 | 6/2001 | Norris et al. | |
| 6,285,893 B1 * | 9/2001 | Keirinbou | 455/575.7 |
| 6,525,762 B1 | 2/2003 | Mileski et al. | |
| 6,957,092 B2 * | 10/2005 | Kotzin | 455/575.8 |
| 2001/0055544 A1 | 12/2001 | Copp | |

\* cited by examiner

*Primary Examiner*—Eugene Yun
(74) *Attorney, Agent, or Firm*—James M. Kasischke; Jean-Paul A. Nasser; Michael P. Stanley

(57) ABSTRACT

A disposable radio communication device includes a body defining an enclosed chamber, a power source mounted in the chamber, an on-off switch mounted on the body and accessible from outside the body, a processor mounted in the chamber and powered by the power source, and a transceiver mounted in the chamber and in communication with the processor. A speaker is mounted in the chamber in communication with the processor. A microphone is mounted in the body and is in communication with the processor. The transceiver is adapted to receive sound signals from a remote unit and input the signals to the speaker for broadcast, and the microphone is adapted to receive sound signals from outside the body and input the received sound signals to the processor for transmittal by the transceiver to the remote unit.

2 Claims, 1 Drawing Sheet

DISPOSABLE RADIO COMMUNICATION DEVICE

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The invention relates to radio communications devices and is directed more particularly to a disposable radio communication device which may be dropped into building rubble, or other such areas not readily accessible by rescue personnel, to make vocal or other sound signal contact with survivors buried in the rubble.

(2) Description of the Prior Art

There have been experiments with disposable microphones which may be dropped into the rubble of collapsed buildings, and the like, to aid search and rescue teams to hear survivors over the surface noise levels caused by heavy lift cranes, air hammers, bull dozers, and large numbers' of rescue workers.

It has become apparent that there is a need for disposable devices of similar nature, but which are adapted for two-way communication between a survivor trapped in the rubble and a surface rescue worker, such that a survivor can be alerted to the fact that he should presently make a sound and can react in a manner to make known his presence.

SUMMARY OF INVENTION

An object of the invention is, therefore, to provide a disposable two-way radio device which may be dropped into a rubble pile and which, by its weight and shape, will tend to drop down well into the rubble before coming to rest.

A further object of the invention is to provide such a device adapted to broadcast a voice message or other signal from a rescue worker at the surface to a location in which the device has come to rest, and to transmit any voice or other message detected by the device back to the rescue worker.

With the above and other objects in view, a feature of the invention is the provision of a disposable radio communication device comprising a body defining an enclosed chamber, a power source mounted in the chamber, an on-off switch mounted on the body and accessible from outside the body, a processor mounted in the chamber and powered by the power source, and a transceiver mounted in the chamber and in communication with the processor. A speaker is mounted in the body and is provided with a face portion substantially co-extensive with an outer surface of the body, the speaker being in communication with the processor, and a microphone is mounted in the body and in communication with the processor. The transceiver is adapted to receive a voice signal or other sound signal, from a remote unit and input the signal to the speaker for broadcast, and the microphone is adapted to receive a sound signal from outside the body and input the received signal to the processor for transmittal by the transceiver to the remote unit.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWING

Reference is made to the accompanying drawing in which is shown an illustrative embodiment of the invention from which its novel features and advantages will be apparent, and wherein.

DESCRIPTION OF THE PREFERRED EMBODIMENT

Figure 1:
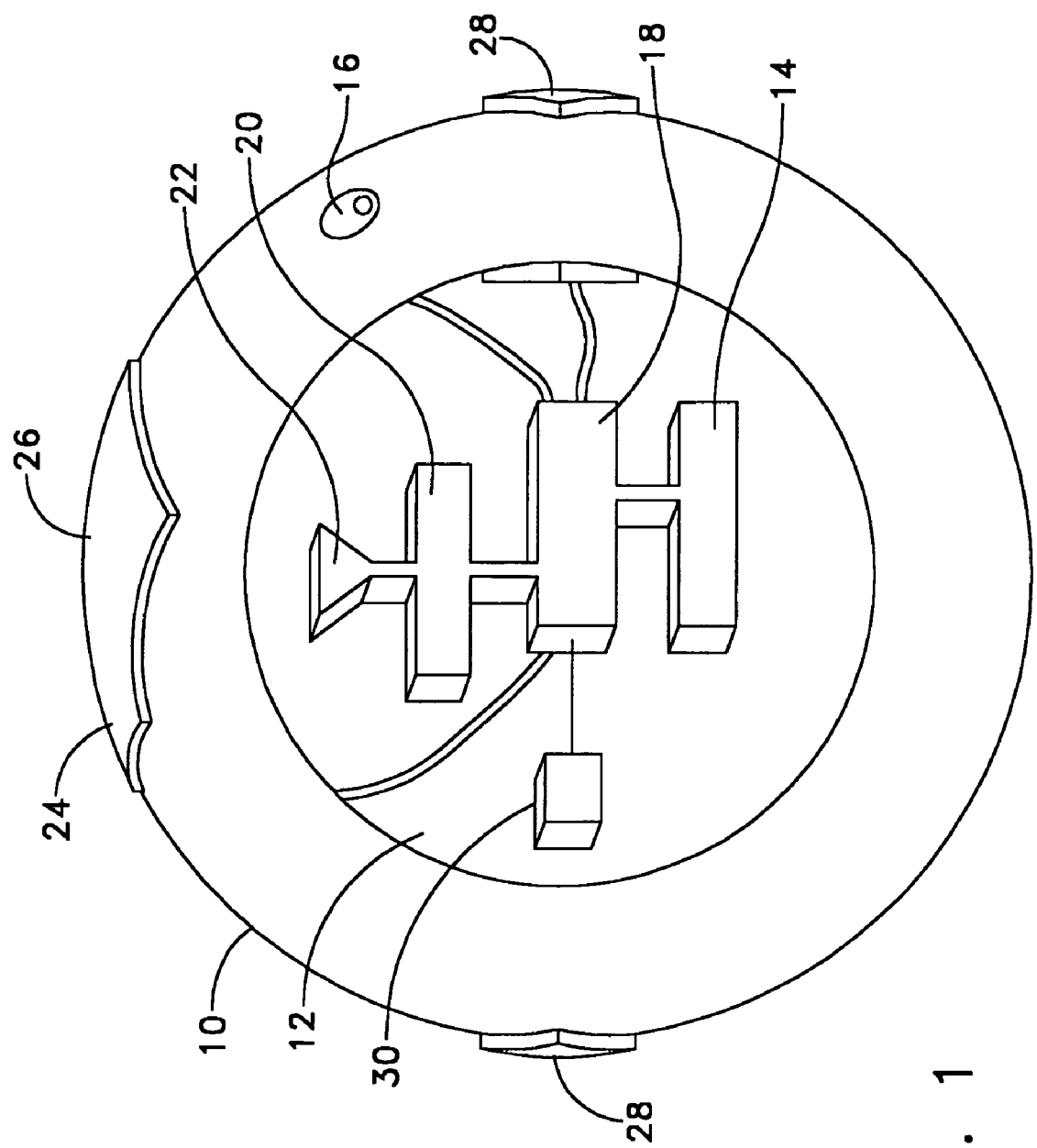
FIG. 1 is a diagrammatic side elevational and broken-away view of a disposable radio communication device illustrative of an embodiment of the invention.

Referring to FIG. 1, is will be seen that a disposable radio communication device illustrative of an embodiment of the invention includes a body 10, preferably of a spherical configuration designed to be rugged enough to with stand impacts and other crushing forces and weighted, defining an enclosed chamber 12.

A power source 14 is mounted in the chamber 12 and may comprise one or more dry cell batteries.

A processor on-off switch 16 is mounted on the body 10 and is accessible from outside of the body to turn on a processor 18 which, when turned on, is powered by the power source 14.

A transceiver 20 is in communication with the processor 18 and is provided with an antenna 22 for communications between the transceiver 20 and a remote unit (not shown).

A broadcast speaker 24 is mounted on the body 10 and is provided with a face portion 26 which is substantially co-extensive with the spherical surface of the body 10. The speaker 24 is in communication with the processor 18.

At least once microphone 28, and preferably a plurality of microphones of the type shown in FIG. 1, is mounted on the body 10. The microphones 28 are in communication with the processor 18.

The transceiver 20 is adapted to receive a voice signal from a remote unit (not shown) and input the signal to the processor 18 and thence to the speaker 24 for broadcast. The microphones 28 are adapted to receive any voice or other sound message from outside the body 10 and input the received message to the processor 18 for transmittal by the transceiver 20 to the remote unit. The broadcast signal may be from a rescue worker at the remote unit, or a recording, urging survivors to utter or tap out a sound. The sound signal is typically a voice message, but may be a metallic "ping", or hand clap, or any other noise which a survivor is capable of producing.

An orientation sensor 30 is disposed in the chamber 12 and is in communication with the processor 18 for providing to the rescue worker an indication as to the direction from which a voice or other sound signal reaches the body 10.

In operation, the switch 16 is moved by an operator to the "on" position which starts operation of the processor 18, which draws power from the power source 14.

The body 10 is dropped into a void in a rubble area. Because of the shape and weight of the body, it tends to roll and bounce through openings in the rubble until coming to a stop.

Upon receipt of a voice message from a rescue worker at a remote site, the speaker 24 begins broadcasting the message into the surrounding rubble.

The processor 18 continues operation of the speaker 24, the transceiver 20, and the microphones 28 as long as there is power provided by the power source 14.

In practice, a number of the devices are tossed into a rubble pile, all in communication with the remote unit.

There is thus provided a disposable radio communication device which may be dropped into a rubble pile and which tends to drop deep into the pile, and which sends any sounds emanating from the area surrounding the device to a remote station for alerting rescue workers to the presence of a survivor.

The broadcast message would be of the sort urging any survivor hearing the message to make a voice noise or any other kind of noise the survivor is capable of generating.

Any such response to the broadcast message is picked up by one of the microphones 28 and is routed by the processor 18 to the transceiver 20, which sends the response to the remote unit, alerting rescue personnel to the presence of one or more survivor in a given area. The orientation sensor 30 provides an indication as to the attitude of the body 10, whether right side up, upside down, or the like. The processor and transceiver provide an indication as to which microphone has received the most pronounced signal. The rescue workers, knowing roughly the location of the body 10, are thereby enabled to start a search in the likeliest location of a survivor.

It will be understood that many additional changes in the details, materials, and arrangement of parts, which have been herein described and illustrated in order to explain the nature of the invention, may be made by those skilled in the art within the principles and scope of the invention as expressed in the appended claims.

What is claimed is:

1. A disposable radio communication device comprising:
   a body defining an enclosed chamber substantially spherical in configuration allowing said body to roll and bounce wherein said body is rugged enough to withstand impacts and other crushing forces, and wherein said body is weighted;
   a power source mounted in the chamber comprising at least one dry cell battery;
   a processor on-off switch mounted on said body and accessible from outside said body;
   a processor mounted in the chamber and powered by said power source;
   a transceiver mounted in the chamber and in communication with said processor;
   an antenna extending from said transceiver and disposed in the chamber for receiving a signal from a remote unit and for transmitting a sound signal to said remote unit;
   a speaker mounted in said body and in communication with said processor, wherein said speaker is a broadcast speaker having a face portion that is substantially co-extensive with the spherical surface of the body;
   a plurality of microphones mounted in said body and in communication with said processor; and
   wherein said transceiver is adapted to receive a broadcast sound signal from a remote unit via said antenna, wherein said transceiver transmits the broadcast sound signal by inputting the broadcast sound signal to said processor and thence to said speaker for broadcast, and wherein said microphones are adapted to receive any sound message from outside the body and input the received sound message to the processor for transmittal by the transceiver to the remote unit, whereby said processor and transceiver provides an indication as to which of said plurality of microphones has received any broadcast sound message;
   an orientation sensor in communication with said processor for providing an indication as to the direction of a sound message generated by an at least one person trapped in a rubble pile of a collapsed building.

2. The disposable radio communication device of claim 1, wherein said body is of a size that is small enough to allow it to be dropped down well into a rubble pile of a collapsed building.

* * * * *